United States Patent
Schetelig et al.

(10) Patent No.: US 7,158,598 B2
(45) Date of Patent: Jan. 2, 2007

(54) METHOD AND DEVICE FOR IDENTIFYING A DATA PACKET IN A DATA STREAM

(75) Inventors: Markus Schetelig, Waltrop (DE); Harald Kafemann, Haltem (DE)

(73) Assignee: Nokia Corporation, Espoo (FI)

( * ) Notice: Subject to any disclaimer, the term of this patent is extended or adjusted under 35 U.S.C. 154(b) by 789 days.

(21) Appl. No.: 09/981,903

(22) Filed: Oct. 19, 2001

(65) Prior Publication Data

US 2002/0048330 A1   Apr. 25, 2002

(30) Foreign Application Priority Data

Oct. 19, 2000   (DE) ................ 100 51 889

(51) Int. Cl.
   *H04L 7/00* (2006.01)
(52) U.S. Cl. ................... 375/368; 370/514
(58) Field of Classification Search ........... 375/368, 375/355, 365, 317; 370/514
   See application file for complete search history.

(56) References Cited

U.S. PATENT DOCUMENTS

| | | | |
|---|---|---|---|
| 5,448,571 A | | 9/1995 | Hong et al. |
| 5,463,401 A | * | 10/1995 | Iwasaki ............. 342/359 |
| 5,566,213 A | | 10/1996 | Carsello |
| 5,729,571 A | * | 3/1998 | Park et al. ............. 375/149 |
| 6,246,735 B1 | * | 6/2001 | Sano et al. ............. 375/364 |
| 6,529,566 B1 | * | 3/2003 | Carsello et al. ........... 375/340 |

FOREIGN PATENT DOCUMENTS

| | | |
|---|---|---|
| JP | PUPA7-30133 | 1/1995 |
| JP | PUPA8-78657 | 3/1996 |
| JP | PUPA 8-146256 | 6/1996 |
| JP | PUPA10-10374 | 1/1998 |
| WO | 00/18150 | 3/2000 |
| WO | 0011831 | 3/2000 |
| WO | 0180508 | 10/2001 |

OTHER PUBLICATIONS

C. Park, et al "Techniques for Channel Estimation, DC-Offset Compensation, and Link Quality Control in Bluetooth System", IEEE Transactions on Consumer Electronics, vol. 46, No. 3, Aug. 2000, pp. 682-689.

* cited by examiner

*Primary Examiner*—Kevin Kim
(74) *Attorney, Agent, or Firm*—Banner & Witcoff, Ltd.

(57) ABSTRACT

The invention relates to a method and a device for identifying a data packet in a data stream, in which by means of a d.c. voltage quota determining circuit (30) the d.c. voltage quota (dc) for a demodulated digital input signal ($S_{in}$) is calculated, in which a k-bit word is allocated to the input signal ($S_{in}$), in that for each symbol of the input signal ($S_{in}$) corresponding to a bit a bit value (1 or 0) is determined by a decoding circuit (37) as a function of the d.c. voltage quota (dc), in which the k-bit word corresponding to the input signal ($S_{in}$) is compared by a comparison and correlation calculating circuit (41) with an expected k-bit synchronization word in order to determine a correlation value ($c_v$) and in which a packet identification signal (Pd) is generated by a correlation value comparison circuit (43) if the correlation value ($c_v$) is greater than a correlation threshold value ($c_{th}$). Calculation of the d.c. voltage quota (dc) is therein repeated continually at least until a packet identification signal (Pd) indicates that a data packet is being received.

21 Claims, 3 Drawing Sheets

METHOD AND DEVICE FOR IDENTIFYING A DATA PACKET IN A DATA STREAM

BACKGROUND OF THE INVENTION

The invention relates to a method and a device for identifying a data packet in a data stream.

FIELD OF THE INVENTION

In digital communications systems based on the TDMA (time division multiple access), such as, for example, systems operating according to the so-called bluetooth standard, transmitters and receivers must be synchronized before data can be transferred. A conventional synchronization method consists in the transmitter transmitting a digital sequence, in other words a sequence of symbols corresponding to individual bits, which is known to the receiver. The receiver now has to look for this sequence and once the sequence has been established chronologically and with its exact position in the frequency band synchronization is successfully completed.

On the receiver side it is first necessary to establish whether a data packet is there or not and if a data packet has been identified, the data or symbol cycle has to be reextracted. On identification of the data packet, which is done with great accuracy, the data cycle or the timing is only roughly assessed, however. On the other side, though reextraction of the data or symbol cycle is done with great precision for valid data packets, it presupposes that the data packet has already been successfully detected.

For a digital communications system operating according to the bluetooth standard and in which a binary Gaussian frequency modulation with low modulation index (narrow band frequency modulation) is used, an optimal data packet detector would consist of a correlator, which compares the wave mode of a received demodulated digital input signal with an expected wave mode and calculates a corresponding correlation value. The calculated correlation value would then correspond to the degree of similarity between the received and the expected wave mode. Apart from the fact that a correlator of this kind could be realized only at great expense of costs and circuitry, the main problem is that the expected wave mode cannot be adequately defined, as it varies from transmitter to transmitter and from receiver to receiver owing to circuit tolerances. Additionally, changes occur with a transmitter and a receiver wave mode, resulting from malfunctions in transmission. Reliable correlation of a received wave mode with an expected wave mode is thus practically impossible.

While the expected wave mode is practically impossible to define, the expected bit sequence in the receiver is fully known.

In a known transmitter-receiver device (WO 00/18150) for a digital communications system, a radio signal received from an aerial is therefore demodulated in the receiver circuit in order to generate a digital input signal. This digital input signal is supplied to a synchronization circuit, which compares the input signal variably with an expected access code, in order to accept the data packet if the received access code is identical to the expected access code. Otherwise the received input signal is rejected.

In order to enable a bit by bit comparison between a digital input signal and an expected access code or synchronization word, in a conventional method the corresponding bit value is allocated to each symbol in the input signal corresponding to a bit in the input signal in that the signal level of the input signal for each symbol is compared with a threshold value, corresponding to an estimated or expected d.c. voltage quota. Owing to system parameter fluctuations, such as carrier frequency deviation and demodulator average frequency deviation, the resulting demodulated signal has a large unknown d.c. voltage quota overlay, which has to be taken into account.

As the actual d.c. voltage quota is different for each data packet, an exact d.c. voltage quota assessment cannot be started until the receiver actually begins to receive a desired data packet. Therefore data packets used in digital communications systems operating according to the DECT standard for digital extension line systems or the IEEE 820.11 standard for wireless local networks have a long initial sequence which does not possess its own d.c. voltage quota, in which in other words the transmitted symbols have a well balanced polarity. A sequence of this kind can, for example, alternately consist of 0 and 1. This allows accurate d.c. voltage quota assessment to be carried out by simple low pass filtration of the demodulated input signal.

In standards which demand only a short initial sequence with well balanced polarity, such as, for example, the bluetooth standard, in which it is guaranteed only that the first four symbols are free of d.c. voltage quota, a d.c. voltage quota assessment of this kind by means of simple low pass filtration cannot be carried out.

The invention provides a method and a device for identifying a data packet in a data stream either of which enables reliable data packet identification even if the initial sequence of a data packet without its own d.c. voltage quota comprises only a few symbols.

SUMMARY OF THE INVENTION

For identifying a data packet in a data stream, it is therefore provided that the d.c. voltage quota for a demodulated digital input signal is calculated, a k-bit word is allocated to the input signal, in that for each symbol of the input signal corresponding to a bit a bit value of 1 or 0 is determined as a function of the d.c. voltage quota, the k-bit word corresponding to the input signal is compared with an expected k-bit synchronization word in order to determine a correlation value and a packet identification signal is generated if the correlation value is greater than a correlation threshold value.

The present invention therefore assumes that every time a k-bit word is allocated to the input signal, the expected k-bit synchronization word has already been fully received, even if this cannot yet be the case, so suitable areas for the calculation of the d.c. voltage quota can be selected from the expected symbol sequence, in other words from the expected synchronization word, to be used for the calculation of the d.c. voltage quota. For this the received demodulated wave mode of the input signal is stored in the form of its scanned values in a delay line at low over—scanning rate and low resolution. The chronological length of the delay line is therein such that the entire symbol sequence used for the data packet identification can be stored therein. The delay line is therefore able to store the entire expected bit synchronization word.

Evaluation of the symbols, in other words allocation of the bit values 1 or 0 to a symbol, is therein continually repeated, as is the calculation of the d.c. voltage quota, for the entire symbol sequence stored as a wave mode, wherein in each case the currently calculated d.c. voltage quota is taken into account. Only when the desired symbol or bit sequence is actually fully stored in the delay line does the calculated d.c. voltage quota fully coincide with the actual d.c. voltage overlap of the input signal, so, as a consequence of this, precisely those bit values which were originally transmitted are allocated to the stored symbols. The k-bit word allocated to the input signal then coincides almost fully with the k-bit synchronization word, so the receipt of a data packet is reliably identified and the d.c. voltage quota for evaluation of the symbols is accurately determined.

A further advantage of the method according to the invention is that by the choice of a suitable correlation threshold value it can be specifically achieved that both the number of actually transmitted, but rejected, data packets (FRR=frame rejection rate) and the number of supposedly received data packets (FAR=false alarm rate) can be kept low.

An advantageous configuration has the input signal scanned in order to generate a sequence of scanned values, corresponding to the input signal and from a selected number of scanned values the d.c. voltage quota of the input signal is calculated, wherein the d.c. voltage quota of the input signal is calculated again after each scan of the input signal at least until the correlation value determined by comparison of the k-bit word corresponding to the input signal with an expected k-bit synchronization word is greater than a correlation threshold value. This enables the method according to the invention to be implemented in a communications system in a particularly efficient way.

In order to prevent high secondary modulation, which causes exceeding of the correlation threshold, from resulting in premature generating of a packet identification signal and therefore to an erroneous identification of a data packet, in an advantageous further development of the invention, it is provided that after the generating of a packet identification signal, the corresponding correlation value is stored and scanning of the input signal, calculation of the d.c. voltage quota and comparison of the k-bit word corresponding to the input signal with an expected k-bit synchronization word for determining the correlation value is continued for a predeterminable period of time and another packet identification signal is generated when a newly determined correlation value is greater than the correlation threshold value and greater than the previously determined stored correlation value.

In this way reliable data packet identification is ensured, as after a first identification of a data packet monitoring is still continued as to whether in fact a better correlation between the k-bit word corresponding to the input signal and the synchronization word occurs, which is then taken as the appropriate data packet identification. If another packet identification signal is generated, the value of the d.c. voltage quota existing at this time is also adopted, while the previous value for this is rejected. The predeterminable period of time can therein be programmed in accordance with the respective requirements for reliability, data transfer speed and implementation expense.

In a further advantageous further development of the invention, it is provided that for determining the k-bit word corresponding to the input signal, the input signal is scanned in order to generate a sequence of scanned values corresponding to the input signal and a bit value 1 or 0 is allocated to each scanned value of a selected multiplicity of scanned values as a function of the d.c. voltage quota of the input signal. Basically it is conceivable to scan the input signal in such a way that on average there are only, e.g. 1.5 or 1.7 scanned values for each portion of the input signal corresponding to a bit. This results, however, in there being two scanned values for some symbols, while for other symbols only one scanned value is determined. However, this can cause more frequent errors in the allocation of the bit value 1 or 0 to a symbol, in particular if a scanned value used for allocating is in the transition area between two symbols. In order to increase the reliability of the method according to the invention here, according to an advantageous further development of the invention it is provided that the input signal is scanned with a frequency $f_{sample}$, which is chosen in such a way that the scanning rate is at least equal to twice the symbol frequency $f_{symb}$, that in other words at least two scanned values are determined for each symbol and that to form the k-bit word corresponding to the input signal in each case only one scanned value per symbol is selected.

It is therein advantageous to select the scanned values for forming the k-bit word corresponding to the input signal from the sequence of scanned values in such a way that the selected scanned values within the sequence in each case are substantially the same distance apart.

Owing to the substantially equal distance between the scanned values within the stored sequence of scanned values, it is achieved that, for determining the bit value of the symbol, scanned values allocated to the central area of the symbol are repeatedly used, so reliable data packet identification is ensured. If therefore, for example, at one time for allocating the k-bit word to the input signal, scanned values are used which are located in the marginal area of the symbol, depending on the size of the scanning rate, in the next or subsequent allocation of the k-bit word to the input signal scanned vales are used which correspond to the chronologically central areas of the symbols.

In another further development of the invention, it is provided that the number of scanned values for calculating the d.c. voltage quota of the input signal is chosen in such a way that the scanned values correspond to areas in the expected k-bit synchronization word, which substantially have the same number of bits with the value "0" as bits with the value "1" and the d.c. voltage quota can be calculated as an average value of the scanned values, wherein the number of scanned values for calculating the d.c. voltage quota consists of at least one group of scanned values in direct succession corresponding to several successive symbols.

It is herein particularly advantageous if the number of scanned values for calculating the d.c. voltage quota consists of two groups of scanned values separated from one another by a multiplicity of scanned values.

The method according to the invention for identifying data packets in a data stream can be configured particularly advantageously with a device which has a delay line with a number of storage places in which scanned values of a demodulated digital input signal are stored in series; a d.c. voltage quota determining circuit, connected to the delay line in order to calculate a d.c. voltage quota of the input signal as an average value of a selected number of scanned values; a decoding circuit, connected to the delay line and the d.c. voltage quota determining circuit, which compares a multiplicity of scanned values with the d.c. voltage quota in order to allocate a bit value 0 or 1 to each scanned value and in this way to form a k-bit word corresponding to the input signal; a comparison and correlation calculating circuit which compares the k-bit word corresponding to the input signal with an expected k-bit synchronization word and calculates a correlation value for the k-bit word corresponding to the input signal, and a correlation value comparison circuit, which compares the correlation value supplied by the comparison and correlation calculating circuit with a correlation threshold value in order to supply a packet identification signal if the correlation value is greater than or equal to the correlation threshold value.

Advantageously the number of storage places of the depth y of the delay line therein corresponds to the number of bits in the synchronization word multiplied by the over-scanning rate, in other words with the number of scanned values per symbol. Each storage place of the delay line can therefore store y bits and therefore a y bit word corresponding to a digitized scanned value of a symbol.

It is further advantageous if the decoding circuit comprises a multiplicity of comparison circuits, next to which in each case the d.c. voltage quota is placed and each of which is connected to one of the storage places of the delay line in order to compare the respective scanned value with the d.c. voltage quota and to determine a bit value 1 or 2, so the k-bit word corresponding to the input signal is adjacent to the output of the decoding circuit.

A particularly advantageous further development of the device according to the invention is characterized in that the d.c. voltage quota determining circuit has at least one addition circuit and one division circuit connected to the output of the addition circuit via a holding element, wherein one input of the addition circuit is connected to a first storage place of the delay line and another input, which is separated from the first storage place by a multiplicity of storage places, is connected to a second storage place of the delay line, wherein the input which is connected to the second storage place is negated or inverted and the output of the addition circuit is led back to a third input via the holding element, so on each addition the result of the preceding addition is also added on, wherein the sum supplied by the holding circuit is divided in the division circuit by a value corresponding to the distance between the two storage places, in order to calculate the d.c. voltage quota, and wherein preferably two addition circuits connected to storage places of the delay line are provided, the output signals of which are supplied to the division circuit via a further addition circuit. The first storage place does not necessarily have to be the first storage place of the delay line.

It is further advantageous if the comparison and correlation calculating circuit connected to the decoding circuit and a register storing the expected k-bit synchronization word, besides a multiplicity of comparison circuits for comparing the k-bit word supplied by the decoding circuit and corresponding to the input signal with the k-bit synchronization word, has a correlation element which adds a one for every coinciding bit pair in order to calculate the correlation value.

BRIEF DESCRIPTION OF THE DRAWINGS

The invention is explained in greater detail below as an example using the drawings.

DETAILED DESCRIPTION OF THE INVENTION

Figure 1:
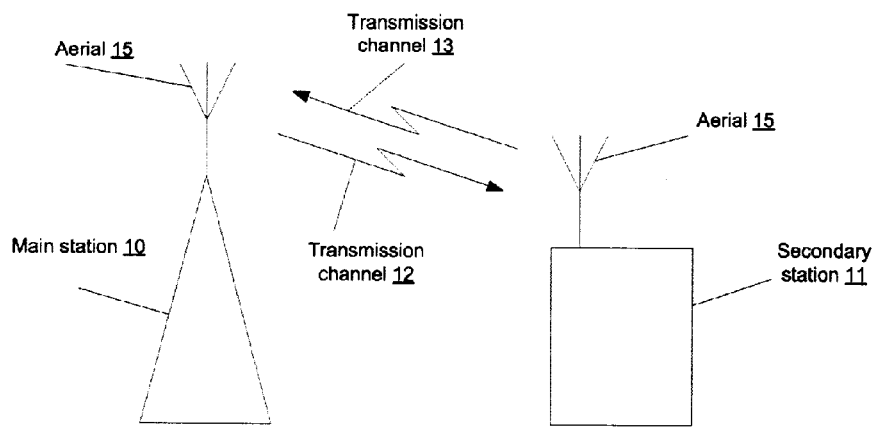
FIG. 1 shows a schematic illustration of a digital communications system with a main station and at least one secondary or ancillary station.

In the various figures of the drawings mutually corresponding components are provided with identical reference numerals.

As indicated purely schematically in FIG. 1, a digital communications system has, for example, a main or base station 10 and at least one ancillary or secondary station 11. The main station 10 and the secondary station are connected to one another via transmission channels 12, 13, in order to exchange data with one another. The main station 10 can therein be, for example, a central control system, which communicates with one or more peripheral appliances, represented by the ancillary or secondary stations 11, via these channels 12, 13, in order to control the peripheral appliances and/or to exchange data with them. For example, a mobile telephone can be provided as the central control appliance or system, connected via radio channels to a microphone/loudspeaker unit. A PC (personal computer), which exchanges data with peripheral appliances, such as printer, scanner and possibly also with a keyboard and a mouse via radio channels 12, 13, so interfering cables can be largely dispensed with, can also act as main station.

Figure 2:
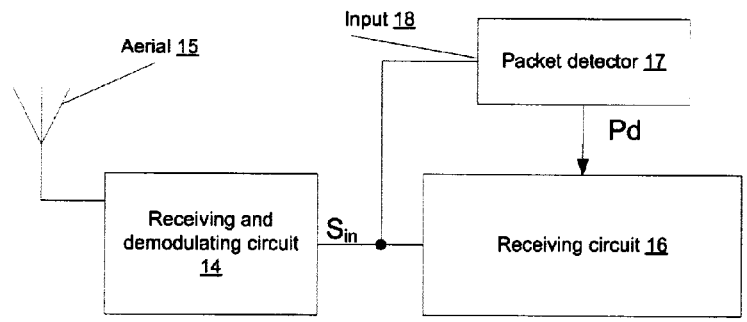
FIG. 2 shows a schematic block diagram of a receiving-side input circuit of a station of the digital communications system.

On the receiving side both the main station and the secondary stations 10, 11 have—as shown in FIG. 2—a receiving and demodulating circuit 14, which demodulates the signal received from an aerial 15 and supplies a digital demodulated input signal $S_{in}$, for a receiving circuit 16, which converts the input signal $S_{in}$ into a bit sequence corresponding to a received data packet. In order to indicate to the receiving circuit 16 whether a received signal corresponds to a data packet for the corresponding station or not a packet detector 17 for identifying data packets in a data receiving stream is provided, which is designated below in short for the sake of simplicity as a packet detector 17. The packet detector 17 receives at its input 18 the input signal $S_{in}$ and supplies a packet identification signal $P_d$ to the receiving circuit 16.

Figure 3:
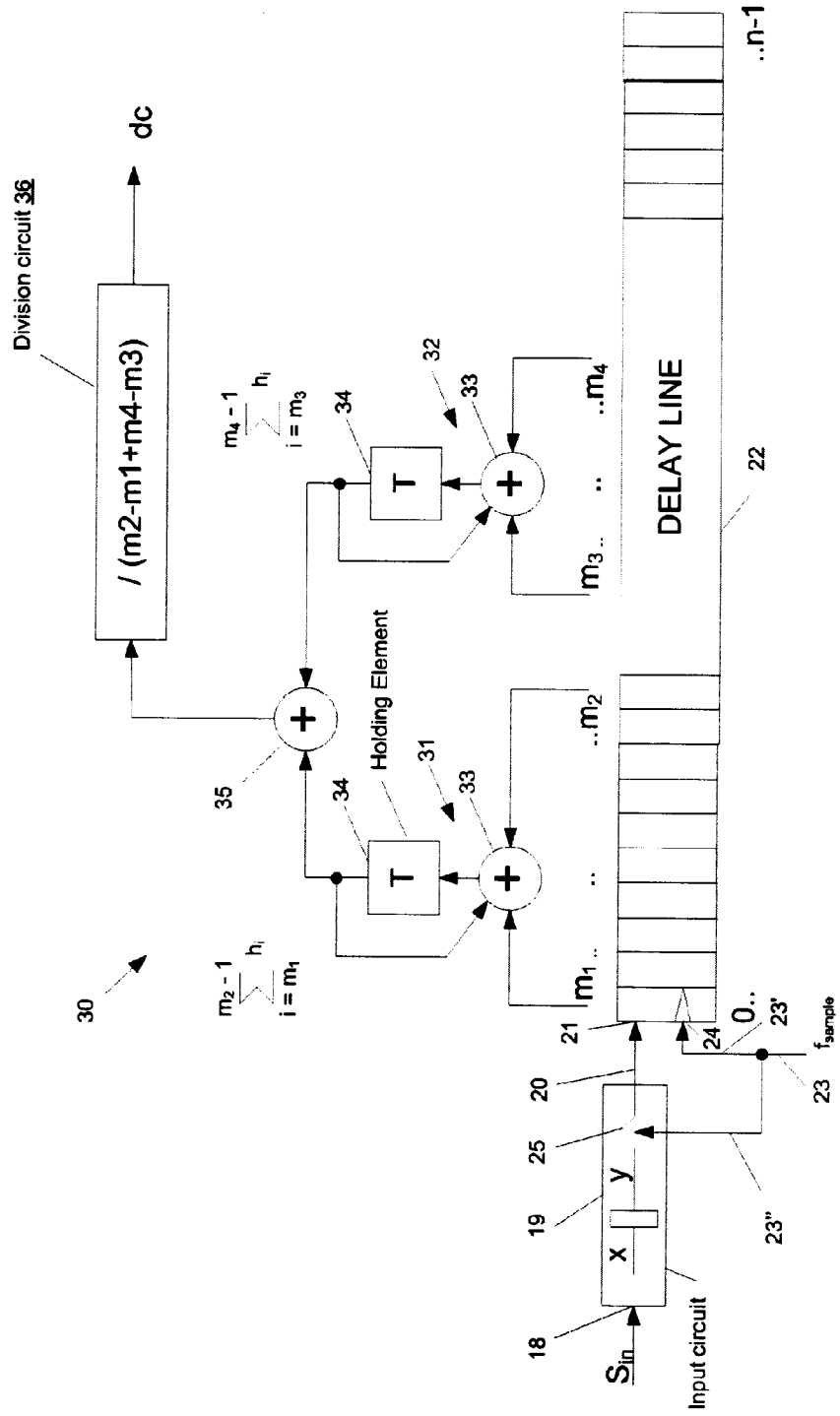
FIG. 3 shows a schematic simplified block diagram of a d.c. voltage quota determining circuit for a device according to the invention for identifying data packets in a data stream.
Figure 4:
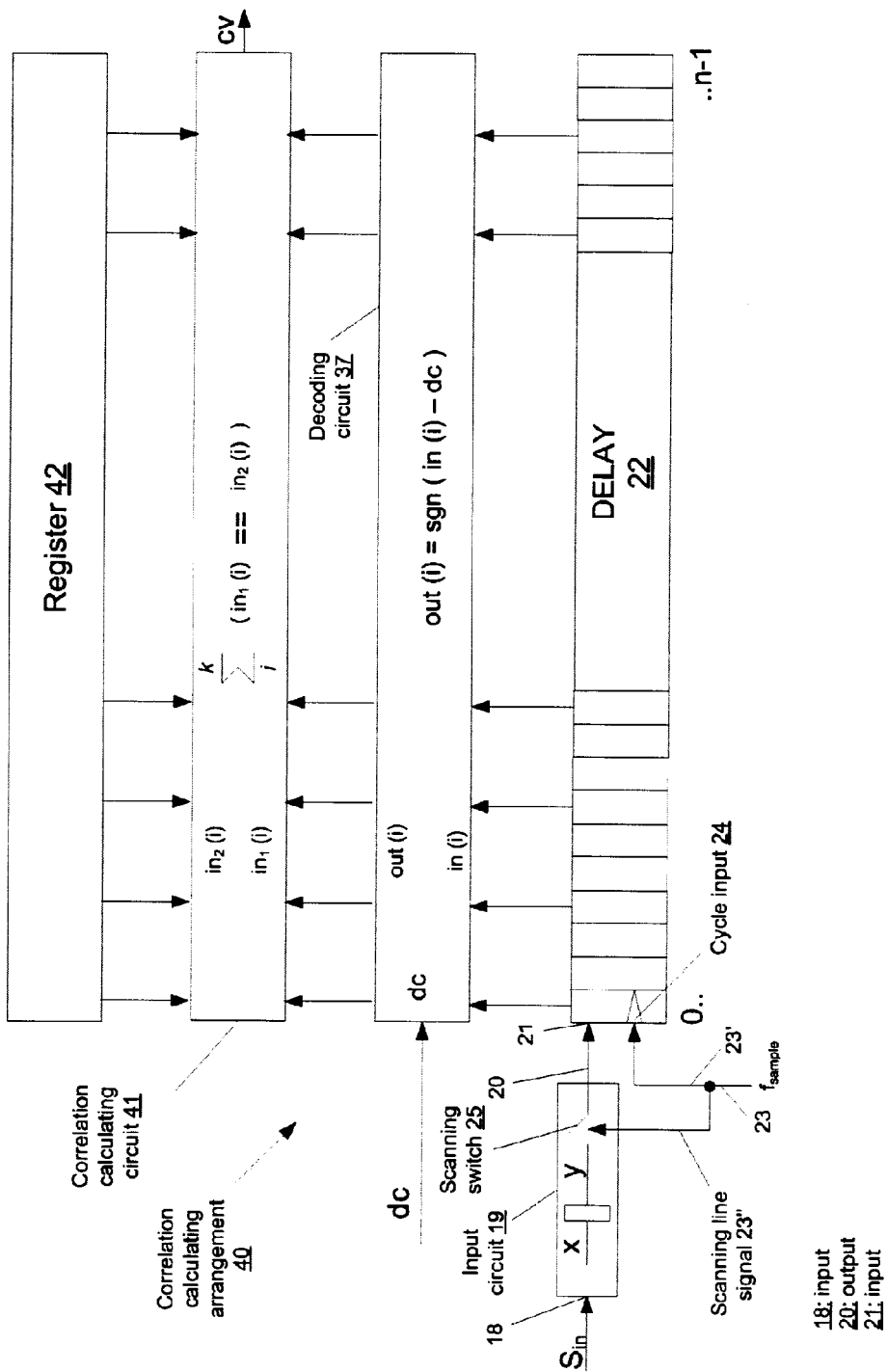
FIG. 4 shows a schematic simplified block diagram of a correlation calculating arrangement for a device according to the invention for identifying data packets in a data-receiving stream.

As shown in FIGS. 3 and 4 the packet detector 17 has an input circuit 19, with the aid of which the data word length x in the input signal $S_{in}$ is matched to an expected data word length y and the scanning rate. An output 20 of the input circuit 19 is connected to an input 21 of a delay line 22. From a scanning signal line 23 a scanning signal with a scanning frequency of $f_{sample}$ is led via branch lines 23', 23" to a cycle input 24 of the delay line 22 and to a scanning switch 25 of the input circuit 19, in order to scan the input signal $S_{111}$ at the provided scanning frequency $f_{sample}$ and to transfer the scanned signal values as scanned values $h_1$ into the delay line 22.

The delay line 22 has n storage places 22.i with the depth y. The number n of storage places 22.i corresponds therein to the number k of bits of an expected synchronous word multiplied by an over-scanning rate $S_{in}$, which indicates the average number of scanned values $h_1$ per symbol of the input signal $S_{in}$.

In order to be able to determine the d.c. voltage quota dc of the input signal $S_{in}$—as shown in FIG. 3—a d.c. voltage quota determining circuit 30 is provided which has at least one, preferably, however, two addition circuits 31, 32 for calculating a first and a second window sum. A window sum is understood here as the sum of all the scanned values $h_1$ stored in the storage places $22.m_1$ to $22.(m_2-1)$ or $22.m_3$ to $22.(m_4-1)$. As with each scanning cycle a new scanned value $h_0$ is transferred into the first storage place $22.0$ of the delay line 22, while all the other scanned values $h_1$ in each case are advanced by one storage place, the window sum changes with each scanning cycle corresponding to the values stored in each case. It should be noted here that the first storage place $22.m_1$ does not necessarily have to be the first storage place of the delay line 22.

In order to calculate the two window sums, each of the two addition circuits 31, 32 has an addition circuit 33, the first input of which is connected to a first storage place $22.n_1$ or $22.m_3$. A second negated or inverted input is connected to the second storage place $22.m_2$ or $22.m_4$ bordering the window area. The output of the addition circuit 33 is led to a holding element 34, the output of which on the one hand is coupled back to a third input of the allocated addition circuit 33 and simultaneously is placed next to an input of a further addition circuit 35, next to the other input of which the output of the holding element 34 of the other addition circuit is placed. The addition circuit 35, which calculates the sum of the two window sums, is led to a division circuit 36, which divides the adjacent sum of the two window sums by the number of scanned values added up in the two windows, in other words by $(m_2-m_1+m_4-m_3)$, in order to calculate the average values of the scanned values representing the d.c. voltage quota of the input signal sections taken into account and to supply a corresponding output signal to a decoding circuit 37 (see FIG. 4) which compares a multiplicity of stored scanned values $h_1$ with the d.c. voltage quota dc, in order to allocate a bit value of 0 or 1 to each of the scanned values and in this way to form a bit word corresponding to the input signal $S_{in}$.

For calculating the d.c. voltage quota dc any other suitable circuit arrangement can be used which enables the average value of a multiplicity of scanned values within a selected window area to be continually calculated, through which window area the scanned value sequence is continuously advanced, so the calculation area for the average value formation slides over the scanned value sequence. In particular a comb filter circuit can also be used.

The two window areas, in other words the storage places $22.m_1$ to $22.(m_2-1)$ and $22.m_3$ to $22.(m_4-1)$ for which the average value of the scanned values $h_1$ is calculated, are therein advantageously placed as a function of the synchronization word to be expected in such a way that they coincide with synchronization word areas, the symbols of which have a well balanced polarity, so the average value can be regarded as a d.c. voltage quota.

For example, according to the bluetooth standard a data packet identification is carried out on the basis of a 64 bit synchronization word, to which another 4 bits of a preamble are added. This 4 bit preamble and a so-called Barker code at the end of the synchronization word, according to the bluetooth standard, comprise a guaranteed well balanced polarity, in other words do not generate their own d.c. voltage quota as a result of an excessive number of ones or zeros, so the average value of the corresponding scanned values reproduces very accurately the d.c. voltage quota at the moment at which the synchronization word and possibly the 4 bit preamble are fully stored in the expected manner in the delay lead 22.

As shown in FIG. 4, the packet detector 17 comprises, besides the d.c. voltage quota determining circuit 30 (see FIG. 3) a correlation calculating arrangement 40 which has, besides the decoding circuit 37, a comparison and correlation calculating circuit 41.

The decoding circuit 37 comprises in a manner not illustrated in greater detail a multiplicity k of subtraction circuits next to which the d.c. voltage quota dc is placed as a signal to be subtracted, while the other inputs of the subtraction circuits are connected in each case to one of the storage places $22.i$ of the delay line 22, so the respective scanned values $h_1$ of the corresponding storage places $22.i$ are adjacent as input signals in(i) of the subtraction circuits. Each of the subtraction circuits supplies an output signal out(i) which, as a function of the previous symbol of the difference (in(i)–dc) is 1 or 0.

From the storage places $22.i$ of the delay line $22,k$ storage places $22.j$ are therein selected in such a way that each symbol in the input signal $S_{in}$ is represented by an individual scanned value $h_j$. With the aid of the subtraction circuits for each symbol in the input signal $S_{in}$, a scanned value $h_1$ is compared with the d.c. voltage quota dc in order to allocate the bit value 1 or 0 to the symbol depending on whether the scanned value is greater or smaller than the d.c. voltage quota dc, in other words depending on whether the difference (in(i)–dc) is positive or negative. In this way it is therefore decided whether a symbol in the input signal $^5m$ represents a bit with a value of 1 or 0.

Instead of the subtraction circuits described, which act as comparison circuits, comparators can also be used, which supply an output signal 1 if the scanned value h~ and therefore the input signal in(i) is greater than the d.c. voltage quota dc and which supply an output signal 0 in the event that the scanned value h~ is smaller than the d.c. voltage quota dc.

Figure 5:
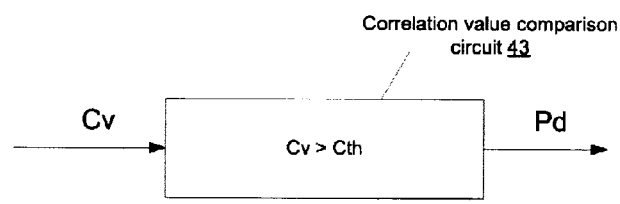
FIG. 5 shows a simplified schematic block diagram of a correlation value comparison circuit for a device according to the invention for identifying data packets in a data receiving stream.

The output signals out(i) of the comparison or subtraction circuits of the decoding circuit 37 are placed next to a multiplicity of first inputs $in_1(i)$ of the comparison and correlation calculating circuit 41. A number k of second inputs $in_2(i)$ is connected to allocated storage places of a register 42, in which the expected k-bit synchronization word is stored. In the comparison and correlation calculating circuit 41, the first and second inputs $in_1(i)$ and $in_2(i)$ allocated to one another in each case are compared with one another in order to supply the value 1 if in each case a 0 or a 1 is adjacent to the two inputs allocated to one another. If the two bit values at the inputs allocated to one another do not coincide, the value 0 is supplied. The values 1 or 0 supplied by corresponding comparison circuits for each of the k input pairs are added up and led as a correlation value $c_v$ to a correlation value comparison circuit 43, illustrated in FIG. 5, which compares the correlation value $c_v$ with a correlation threshold value $c_{th}$ and which supplies a packet identification signal Pd if the correlation value $c_v$ is greater than the correlation threshold value $c_{th}$. The packet identification signal $P_d$ is supplied to the receiving circuit 16 in order to indicate to it that a data packet destined for the respective receiving station is being received.

During normal receiving stand-by, the packet detector 17 according to the invention operates as follows.

As soon as the input circuit is switched to receive the input signal $S_{in}$, the signal $S_{in}$ input to adjacent to the input circuit 19 is scanned at a scanning frequency $f_{sample}$ in order to generate a plurality of scanned values $h_i$ for each symbol in the input signal $S_{in}$. Although it is conceivable that on average each symbol is scanned at a non-integral over-scanning rate smaller than two, it is advantageous if each symbol is scanned at an integral over-scanning rate greater than or equal to two, so for each symbol at least two scanned values $h_i$ are determined. In the embodiment illustrated in FIG. 4, it is assumed that for each symbol in the input signal 3 scanned values are ascertained and stored. The delay line 22 thus comprises, under the presupposition that, for example, according to the bluetooth standard, a €4 bit synchronization word with an additional 4 bit preamble is to be monitored, n=204 storage places 22.0 to 22.203.

Simultaneously with the start of scanning of the input signal $S_{in}$, a d.c. voltage quota dc is calculated from the scanned values $h_i$ by the d.c. voltage quota determining circuit 30, wherein at any time it is assumed that the full synchronization word has already been received, even if this cannot yet be the case. Owing to the calculated d.c. voltage quota dc, a k-bit word, for example a 64 bit word, is allocated to the wave mode of the input signal $S_{in}$ stored in the delay line 22, which k—bit word is compared in the manner described with the 64 bit synchronization word stored in the register 42 of the comparison and correlation calculating circuit 41, in order to calculate a correlation value $c_v$.

By means of a suitable selection of the storage places 22.$i$ connected to the decoding circuit only such scanned values are taken into account for the correlation calculation as correspond to the symbols of the 64 bit word to be compared with the 64 bit synchronization word. For the d.c. voltage quota calculation, however, scanned values of symbols received before and after the 64 bit synchronization word can also be taken into account, in other words in particular scanned values of the four symbols of the preamble.

This process is continually repeated after each scan at least until the correlation value $c_v$ is greater than a correlation threshold value $c_{th}$. This is the case if the expected synchronization word has been fully received. In this case the determined d.c. voltage quota dc also coincides exactly with the d.c. voltage quota overlaid on the input signal as a result of interference effects or tolerance deviations, so reliable allocation of the bits to the symbols of the input signal $S_{in}$ can take place.

After a packet identification signal has first been generated, the corresponding correlation value $c_v$ is stored and scanning of the input signal $S_{in}$, calculation of the d.c. voltage quota and comparison of the k-bit word corresponding to the input signal with the expected synchronization word are continued in premature exceeding of the correlation threshold. If during a predeterminable period of time, which can be programmed, a correlation value $c_v$ occurs which exceeds not only the correlation value $c_v$, but also the previous stored correlation value $c_v$, a packet identification signal is generated again and the d.c. voltage quota dc associated with it is adopted for further processing of the input signal $S_{in}$, while the previous values are rejected.

The invention claimed is:

1. A method for identifying a data packet in a data stream in which
   a d.c. voltage quota for a demodulated digital input signal is calculated in that the input signal is scanned in order to generate a sequence of scanned values and from a selected number of the sequence of scanned values the d.c. voltage quota of the input signal is calculated;
   a k-bit word is allocated to the input signal for that for each symbol of the input signal corresponding to a bit, a bit value is determined as a function of the d.c. voltage quota;
   the k-bit word corresponding to the input signal is compared with an expected k-bit synchronization word in order to determine a correlation value; and
   a packet identification signal is generated if the correlation value is greater than a correlation threshold value; and wherein
   the d.c. voltage quota of the input signal is calculated again after each scan of the input signal at least until the correlation value determined by comparison of the k-bit word corresponding to the input signal with an expected k-bit synchronization word is greater than the correlation threshold value.

2. The method according to claim 1, wherein after a packet identification signal has been generated, the corresponding correlation value is stored and scanning of the input signal calculation of the d.c. voltage quota, and comparison of the k-bit word with an expected k-bit synchronization word to determine the correlation value are still continued for a predetermined period of time and a new packet identification signal is generated if a newly determined correlation value is greater than the correlation threshold value and greater than the previously determined stored correlation value.

3. The method according to claim 2, wherein to determine the k-bit word corresponding to the input signal, the input signal is scanned in order to generate a sequence of scanned values and a bit value is allocated to each scanned value of a selected multiplicity of scanned values as a function of the d.c. voltage quota of the input signal.

4. The method according to claim 3, wherein the input signal is scanned at a frequency which is chosen in such a way that an over-scanning rate is at least equal to two, that therefore at least two scanned values are determined for each symbol and to form the k-bit word corresponding to the input signal in each case only one scanned value per symbol is selected.

5. The method according to claim 2, wherein the multiplicity of scanned values for forming the k-bit word corresponding to the input signal is selected from the sequence of scanned values in such a way that the selected scanned values within the sequence in each case are substantially the same distance apart.

6. The method according to claim 5, wherein the number of scanned values for calculating the d.c. voltage quota of the input signal is chosen in such a way that the scanned values correspond to areas in the expected k-bit synchronization word which substantially have the same number of bits with the value 0 and bits with the value 1 and the d.c. voltage quota is calculated as an average value of the scanned values.

7. The method according to claim 6, wherein the number of scanned values for calculating the d.c. voltage quota consists of at least one group of scanned values in direct succession to one another, which correspond to successive symbols.

8. The method according to claim 6, wherein the number of scanned values for calculating the d.c. voltage quota consists of two groups of scanned values, which are separated from one another by scanned values.

9. A device for identifying data packets in a data receiving stream with a delay line which has a number of storage places, in which scanned values of a demodulated digital input signal are stored in series, a d.c. voltage quota determining circuit, which is connected to the delay line in order to calculate a d.c. voltage quota of the input signal as an average value of a selected number of the scanned values comprising:
   a decoding circuit connected to the delay line and the d.c. voltage quota determining circuit which compares a multiplicity of the scanned values with the d.c. voltage quota in order to allocate a bit value to each scanned value and in this way to form a k-bit word corresponding to the input signal;

a comparison and correlation calculating circuit which compares the k-bit word corresponding to the input signal with an expected k-bit synchronization word and calculates a correlation value for the k-bit word corresponding to the input signal; and a correlation value comparison circuit which compares the correlation value supplied by the comparison and correlation calculating circuit with a correlation threshold value in order to supply a packet identification signal if the correlation value is greater than or equal to the correlation threshold value; and wherein the decoding circuit comprises a multiplicity k of comparison circuits, to which in each case is applied the d.c. voltage quota and each of which is connected to one of the storage places of the delay line in order to compare the respective scanned value with the d.c. voltage quota and to determine a bit value, so the k-bit word corresponding to the input signal is applied to outputs of the decoding circuit.

10. The device according to claim 9, wherein the number of storage places of the delay line corresponds to the number k of bits in the k-bit synchronization word multiplied by an over-scanning rate, in other words with the number of scanned values per symbol.

11. A device for identifying data packets in a data receiving stream with a delay line which has a number of storage places, in which scanned values of a demodulated digital input signal are stored in series, and a d.c. voltage quota determining circuit, which is connected to the delay line in order to calculate a d.c. voltage quota of the input signal as an average value of a selected number of the scanned values comprising:

a decoding circuit connected to the delay line and the d.c. voltage quota determining circuit which compares a multiplicity of the scanned values with the d.c. voltage quota in order to allocate a bit value to each scanned value and to form a k-bit word corresponding to the input signal;

a comparison and correlation calculating circuit which compares the k-bit word corresponding to the input signal with an expected k-bit synchronization word and calculates a correlation value for the k-bit word corresponding to the input signal; and a correlation value comparison circuit which compares the correlation value supplied by the comparison and correlation calculating circuit with a correlation threshold value in order to supply a packet identification signal if the correlation value is greater than or equal to the correlation threshold value; and wherein the d.c. voltage quota determining circuit has at least one addition circuit and one division circuit connected to the output of the addition circuit via a holding element;

one input of the addition circuit is connected to a first storage place of the delay line and another input is connected to a second storage place of the delay line, which is separated from the first storage place by a multiplicity of storage places; and the input, which is connected to the second storage place, is negated and the output of the addition circuit is fed back to a third input via the holding element, so that with each addition the result of the preceding addition is added on and wherein a sum supplied by the holding circuit is divided in the division circuit by a value corresponding to the distance between the storage places in order to calculate the d.c. voltage quota.

12. The device according to claim 11, wherein two addition circuits connected to storage places of the delay line are provided, output signals of which are supplied to the division circuit via a further addition circuit.

13. The device according to claim 12, wherein the comparison and correlation calculating circuit operatively connected to the decoding circuit, a register storing the expected k-bit synchronization word, and a multiplicity k of comparison circuits for comparing the k-bit word with the expected k-bit synchronization word, has a correlation element which adds a one for each coinciding bit pair in order to calculate the correlation value.

14. The method according claim 1, wherein after a packet identification signal has been generated, the corresponding correlation value is stored and scanning of the input signal, calculation of the d.c. voltage quotas and comparison of the k-bit word corresponding to the input signal with an expected k-bit synchronization word to determine the correlation value are still continued for a predeterminable period of time and a new packet identification signal is generated if a newly determined correlation value is greater than the correlation threshold value and greater than the previously determined stored correlation value.

15. The method according to claim 7, wherein the number of scanned values for calculating the d.c. voltage quota consists of two groups of scanned values, which are separated from one another by a multiplicity of scanned values.

16. The device according to claim 10, wherein the decoding circuit comprises a multiplicity k of comparison circuits, to which in each case is applied the d.c. voltage quota and each of which is connected to one of the storage places of the delay line in order to compare the respective scanned value with the d.c. voltage quota and to determine a bit value, so a k-bit word corresponding to the input signal is applied to outputs of the decoding circuit.

17. The device according to claim 10, wherein the d.c. voltage quota determining circuit has at least one addition circuit and one division circuit connected to the output of the addition circuit via a holding element, wherein one input of the addition circuit is connected to a first storage place of the delay line and another input is connected to a second storage place of the delay line which is separated from the first storage place by a multiplicity of storage places; and the input which is connected to the second storage place is negated and the output of the addition circuit is fed back to a third input via the holding element, so that with each addition the result of the preceding addition is added on and wherein the sum supplied by the holding circuit is divided in the division circuit by a value corresponding to the distance between the storage places in order to calculate the d.c. voltage quota.

18. The device according to claim 9, wherein the d.c. voltage quota determining circuit has at least one addition circuit and one division circuit connected to the output of the addition circuit via a holding element, wherein one input of the addition circuit is connected to a first storage place of the delay line and another input is connected to a second storage place of the delay line which is separated from the first storage place by a multiplicity of storage places; and the input which is connected to the second storage place is negated and the output of the addition circuit is fed back to a third input via the holding element, so that with each addition the result of the preceding addition is added on and wherein a sum supplied by the holding circuit is divided in the division circuit by a value corresponding to the distance between the storage places in order to calculate the d.c. voltage quota.

19. The method according to claim 6, wherein the number of scanned values for calculating the d.c. voltage quota includes at least one group of scanned values in direct succession to one another, which correspond to successive symbols.

20. The method according to claim 9, wherein the number of scanned values for calculating the d.c. voltage quota includes two groups of scanned values, which are separated from one another by a multiplicity of scanned values.

21. The method according to claim 6, wherein the number of scanned values for calculating the d.c. voltage quota includes two groups of scanned values, which are separated from one another by scanned values.

* * * * *

UNITED STATES PATENT AND TRADEMARK OFFICE
CERTIFICATE OF CORRECTION

PATENT NO.        : 7,158,598 B2
APPLICATION NO. : 09/981903
DATED             : January 2, 2007
INVENTOR(S)       : Markus Schetelig et al.

It is certified that error appears in the above-identified patent and that said Letters Patent is hereby corrected as shown below:

Column 10, Line 13:
    Please delete "signal calculation" and insert --signal, calculation--

Column 12, Line 18:
    Please delete "voltage quotas and" and insert --voltage quota, and--

Signed and Sealed this

Nineteenth Day of June, 2007

JON W. DUDAS
*Director of the United States Patent and Trademark Office*